US010240751B2

(12) United States Patent
Zapata et al.

(10) Patent No.: US 10,240,751 B2
(45) Date of Patent: Mar. 26, 2019

(54) SYSTEMS AND METHODS OF ILLUMINATION (71) Applicant: TurningMode, LLC, Chagrin Falls, OH (US)

(72) Inventors: Jorge Zapata, Chagrin Falls, OH (US); Carlos Eduardo Vargas Silva, Antioquia (CO)

(73) Assignee: TurningMode, LLC, Chagrin Falls, OH (US)

( * ) Notice: Subject to any disclaimer, the term of this patent is extended or adjusted under 35 U.S.C. 154(b) by 21 days.

(21) Appl. No.: 15/467,531

(22) Filed: Mar. 23, 2017

(65) Prior Publication Data
US 2017/0276324 A1  Sep. 28, 2017

Related U.S. Application Data (60) Provisional application No. 62/312,512, filed on Mar. 24, 2016.

(51) Int. Cl.
*F21V 14/02* (2006.01)
*F21S 8/02* (2006.01)
(Continued)

(52) U.S. Cl.
CPC .............. *F21V 14/02* (2013.01); *F21S 8/026* (2013.01); *F21V 23/0478* (2013.01); *H05B 33/0854* (2013.01); *H05B 37/0227* (2013.01); *F21S 2/00* (2013.01); *F21W 2131/20* (2013.01); *F21Y 2115/10* (2016.08)

(58) Field of Classification Search
CPC .. F21V 23/0471; F21V 23/0442; F21V 14/02; F21V 14/025; F21V 14/04; F21V 14/045; F21V 14/06; F21V 14/065; A61B 90/30; H05B 37/0227; F21Y 2115/10; F21Y 2105/00; F21Y 2105/10; F21Y 2105/12; F21Y 2105/14; F21Y 2105/16; F21Y 2105/18
See application file for complete search history.

(56) References Cited

U.S. PATENT DOCUMENTS 4,884,008 A * 11/1989 Bossler ............... F21V 14/04
315/152
6,880,957 B2 * 4/2005 Walters ............ F21V 23/0442
250/205

(Continued)

*Primary Examiner* — Robert J May
(74) *Attorney, Agent, or Firm* — Tucker Ellis LLP; Heather M. Barnes; Michael G. Craig (57) ABSTRACT One or more techniques and/or systems are disclosed for illuminating a target area. Such systems may mitigate shadows and lack of light homogeneity at surgical intervention settings, or any other clinical or otherwise critical human operational confined area that utilize a substantially uniform light flooding. One or more lighting modules can be disposed in a target area, for illumination one or more illumination target locations. An object detection component can detect an object in the target illumination location, and provide data indicative of the detected object to an illumination module adjustment component. Based on the data indicative of the detected object, the illumination module adjustment component can provide data indicative of an illumination adjustment to the first illumination module.

18 Claims, 6 Drawing Sheets (51) Int. Cl.
*F21V 23/04* (2006.01)
*H05B 33/08* (2006.01)
*H05B 37/02* (2006.01)
*F21W 131/20* (2006.01)
*F21Y 115/10* (2016.01)
*F21S 2/00* (2016.01)

(56) References Cited

U.S. PATENT DOCUMENTS

| | | | |
|---|---|---|---|
| 8,292,804 B2 * | 10/2012 | Marka | A61B 90/35 |
| | | | 600/249 |
| 9,119,668 B2 * | 9/2015 | Marka | A61B 90/35 |
| 9,491,835 B2 * | 11/2016 | Elfring | F21V 23/0471 |
| 9,587,804 B2 * | 3/2017 | Chen | F21V 14/02 |
| 9,955,551 B2 * | 4/2018 | Spero | F21S 41/143 |

* cited by examiner

SYSTEMS AND METHODS OF ILLUMINATION

CROSS-REFERENCE TO RELATED APPLICATIONS

This application claims priority to U.S. Ser. No. 62/312,512, entitled SYSTEMS AND METHODS OF ILLUMINATION FOR CLINICAL SETTINGS, filed Mar. 24, 2016, which is incorporated herein by reference.

BACKGROUND

The inability of the current state of the art of illuminating systems to eliminate shadows at surgical operating rooms or any other clinical or otherwise critical human operational confined area that requires a uniform light flooding is to the disadvantage of the surgeon or any other critical operator and ultimately to the patient. The luminaries and other illuminating system currently used worldwide at those settings are fundamentally based on a 100+ years old technology that requires bulky devices to be located on top or at the near vicinity of the patient thus interfering with the flow of laminar air that is critical for the aseptic conditions requirements of the area in question. The current state of the art also requires interacting physically with objects to control the luminary, providing with additional aseptic requirements to the luminary or illumination system. In addition, The heat generated by the lights and inability or otherwise prohibit ability to setup multiple light targets or light focal points of the current state of the art provides additional risk to the patient and additional burden to the surgeon and other critical operators

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

As provided herein, systems and methods of illumination disclosed here address the manifestation of shadows and lack of light homogeneity at surgical intervention settings, or any other clinical or otherwise critical human operational confined area that requires a uniform light flooding. These systems and methods of illumination may also provide the ability to setup a single or a plurality of light focal points or targets without the need of touching or otherwise physically handling the illuminating system but rather using gestures from a designated primary user that is present at the illuminated locale.

In one implementation, a system for illuminating a target area can comprise a first illumination module that directs light toward a first target area. Further, in this implementation, the system can comprise an object detection component to detect an object in a target illumination location. Additionally, the system can comprise an illumination module adjustment component that receives data indicative of a detected object from the object detection component. In this implementation, the illumination module adjustment component can transmit data indicative of an illumination adjustment to the first illumination module, where the data indicative of an illumination adjustment is based at least upon the data indicative of a detected object.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

What is disclosed herein may take physical form in certain parts and arrangement of parts, and will be described in detail in this specification and illustrated in the accompanying drawings which form a part hereof and wherein.

DETAILED DESCRIPTION

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices may be shown in block diagram form in order to facilitate describing the claimed subject matter.

The methods and systems disclosed herein, for example, may be suitable for use in, but not limited to, surgical operating rooms, dental suites, medical intervention rooms, medical examination rooms, laboratories and/or other clinical or otherwise critical human operational confined area that utilizes a uniform light flooding. As an example, some of the issues addressed by the methods and system described herein can include, but are not limited to: mitigating shadows or otherwise lack of uniform light flooding in target work areas; simultaneously illuminating a plurality of target areas; creating improved illuminating patterns in real time to account for human traffic, human motion and/or other dynamic interference (e.g., by objects) between the light source and the illuminating target; improving laminar airflow; creating more desirable light wave length pattern in real time, in order to highlight designated illumination targets; reducing heat generated by luminaries and illumination systems; and improvement of aseptic conditions of control objects used to operate luminaries and illuminations systems.

In one aspect, the systems and methods of illumination disclosed herein may use an array of light sources grouped in configurable modules to dynamically accommodate specific circumstances of a target area or volume that is desired to be illuminated. In this aspect, the configured modules can work in scalable tandem. As an example, a number and/or type of modules used in an installation may be a function of the nature of the illumination desired and characteristics of the area or volume of the space where the illumination target or plurality of targets are located.

Figure 1A:
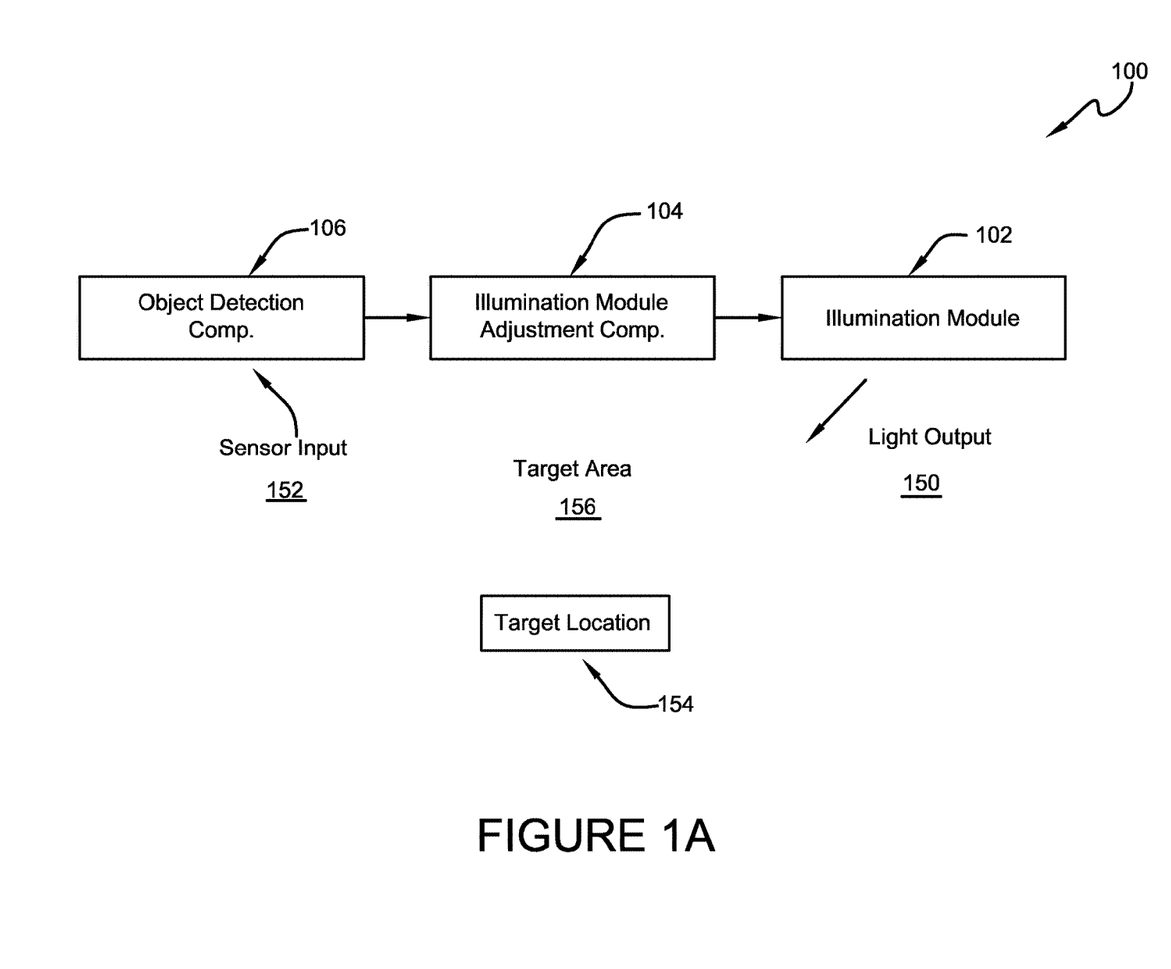
FIGS. 1A and 1B are a schematic diagrams illustrating example implementations of an exemplary system 100 for providing substantially uniform illumination in one or more target locations of a target area.
Figure 1B:
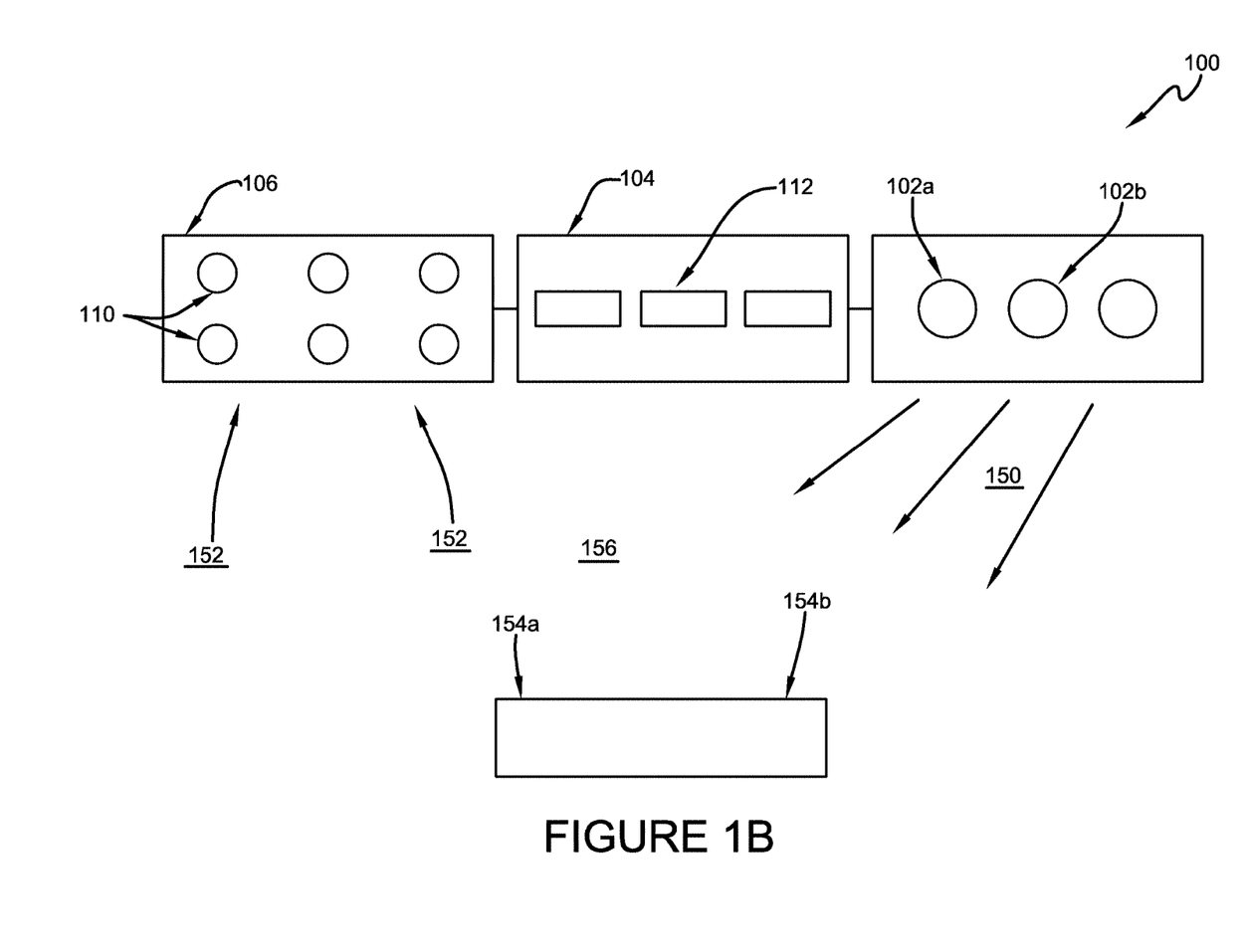

In one aspect, a target area can be illuminated, including one or more target locations in the target area, in a desired manner, such as to provide appropriate illumination for a task, and to mitigate shadows or improve substantially uniform illumination. FIGS. 1A and 1B are schematic diagrams illustrating an exemplary system 100 for providing substantially uniform illumination in one or more target locations of a target area. The exemplary system 100 comprises a first illumination module 102 that directs light toward a first target area 156. In one implementation, one or more lighting modules 102 can be disposed in an room to direct light toward the target area 156, such as an area where an operation utilizing illumination takes place. As an example, a target area 156 can comprise an operation theatre (e.g., operating room), a dental suite, medical intervention room, medical examination room, laboratory and/or other clinical or otherwise critical human operational confined area that may typically utilizes a uniform light flooding, or spot lighting system (e.g., a theatrical or musical stage).

In one implementation, a number of modules 102a, 102b utilized by an exemplary system 100 may be determined by one or more factors, such as a size of the target area 156; a size and number of associated target locations 154 in the target area 156; a desired amount of illumination for respective target locations 154; an expected number and amount of objects (e.g., devices, etc., and/or people) located in the target area 156, and/or a location and distance between the one or more target locations 154 and the placement of the module(s) 102. Further, the number and location of the one or more lighting modules 102 may be determined by a light output 150 from the respective modules 102. For example, as a number of lighting modules 102, and/or light output specification of lighting elements in the lighting module 102 increases, the light output 150 from the module 102 can also increase (e.g., and inversely, as the number and/or output of respective lighting elements decreases, the module output 150 can also decrease).

As illustrated in FIG. 1, the exemplary system 100 can comprise an object detection component 106 to detect an object in the target location 154, in the target area 156. In one implementation, the object detection component 106 can comprise one or more sensors 110, such as a camera, sound detector, or other electromagnetic signal detector. In one implementation, the sensor(s) 110 in the object detection component 106 can be used to detect objects, actions, movement, user gestures, etc., in a target area 156.

As illustrated in FIG. 1, the exemplary system 100 can comprise an illumination module adjustment component 104. The illumination module adjustment component 104 can receive data from the object detection component 106 that is indicative of a detected object, and transmits data to the first illumination module 102 that is indicative of an illumination adjustment to be made by the first illumination module 102. The adjustment data can be based at least upon the data indicative of a detected object. In one implementation, the illumination module adjustment component 104 can comprise one or more processors 112 that may be used to process data indicative of lighting scenario information, and output data indicative of one or more lighting module setting adjustments. As an example, data indicative of lighting scenario information may comprise pre-determined settings information provided by a user and/or administrator of the system, information identified during operational use of the system, information provided by a user during operational use of the system, and/or user/administrator feedback information provided at times of non-operational use of the system.

Further, in this implementation, the object detection component 106 can be communicatively coupled (e.g., wired and/or wirelessly) with the illumination module adjustment component 104. In this way, for example, the object detection component 106 can send data to processors 112 in the illumination module adjustment component 104, where the data sent is indicative of detected situations in the target area 156. As an example, situations in the target area 156 can comprise detection/identification of objects, detection of movement of objects, and detection of illumination in the target area 156 and/or one or more of the target locations 154.

As an example, in one implementation, one or more modules 102, including the first module 102a, and a second module 102b, can be disposed at or near the ceiling and/or surrounding walls of the target area 156, or parts thereof, to be illuminated (e.g., room, part of a room, or anywhere a procedure utilizes a desired illumination). In this implementation, the module(s) 102 can be arranged such that an illumination target (e.g., target location 154), or plurality of illumination targets (e.g., a first target location 154a, and a second target location 154b), can be sufficiently illuminated (e.g., directly). Further, in this implementation, one or more sensors 110 in the object detection component 106 can be distributed around the target area 156 in a manner that allows for object and illumination detection in the target area 156. As one example, a sensor 112 may be disposed with respective modules 102; and/or may be disposed at respective target locations 154a, 154b, such as, at or near the ceiling and/or surrounding walls. As another example, the sensor(s) may be disposed at a centralized location, or a location sufficient to detect objects in the target area 156.

Figure 2:
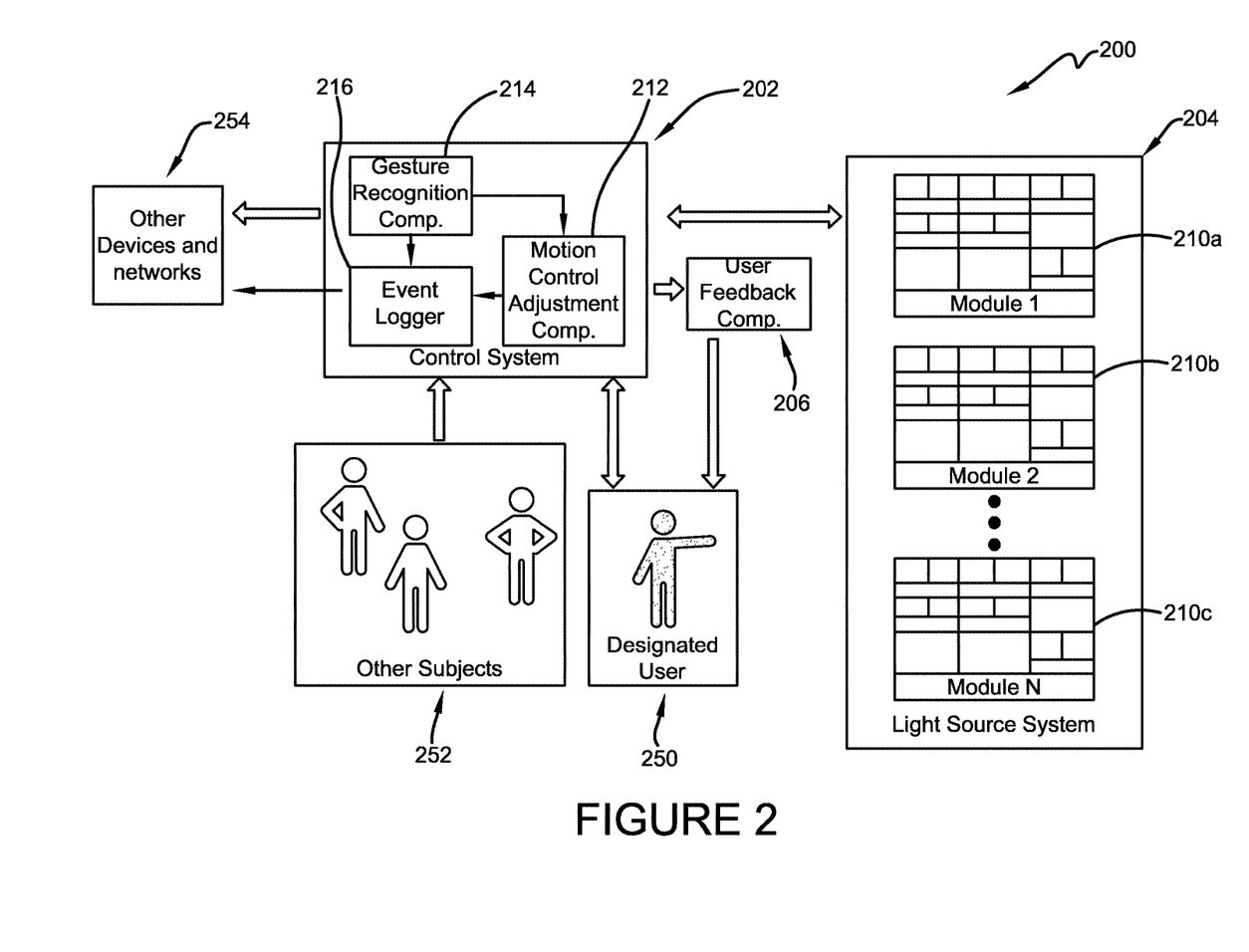
FIG. 2 is a schematic diagram illustrating an example implementation of one or more portions of one or more systems described herein.

With continued reference to FIGS. 1A and 1B, FIG. 2 is a schematic diagram illustrating an example implementation of one or more portions of a system 200 for providing desired illumination of a target area. In this example implementation, a system 200 can comprise a light source system component 204, a control system component 202 (e.g., comprising the object detection component 106, and the illumination module adjustment component 104), and a user feedback subsystem component 206. In one implementation, the example system 200 can be managed by one or more designated users 250. Further, in some implementations, other subjects 252 may be located in the target area (e.g., the first target area 156). Additionally, in some implementations, one or more other devices and/or networks 254 can be coupled with the example system 200.

Figure 3:
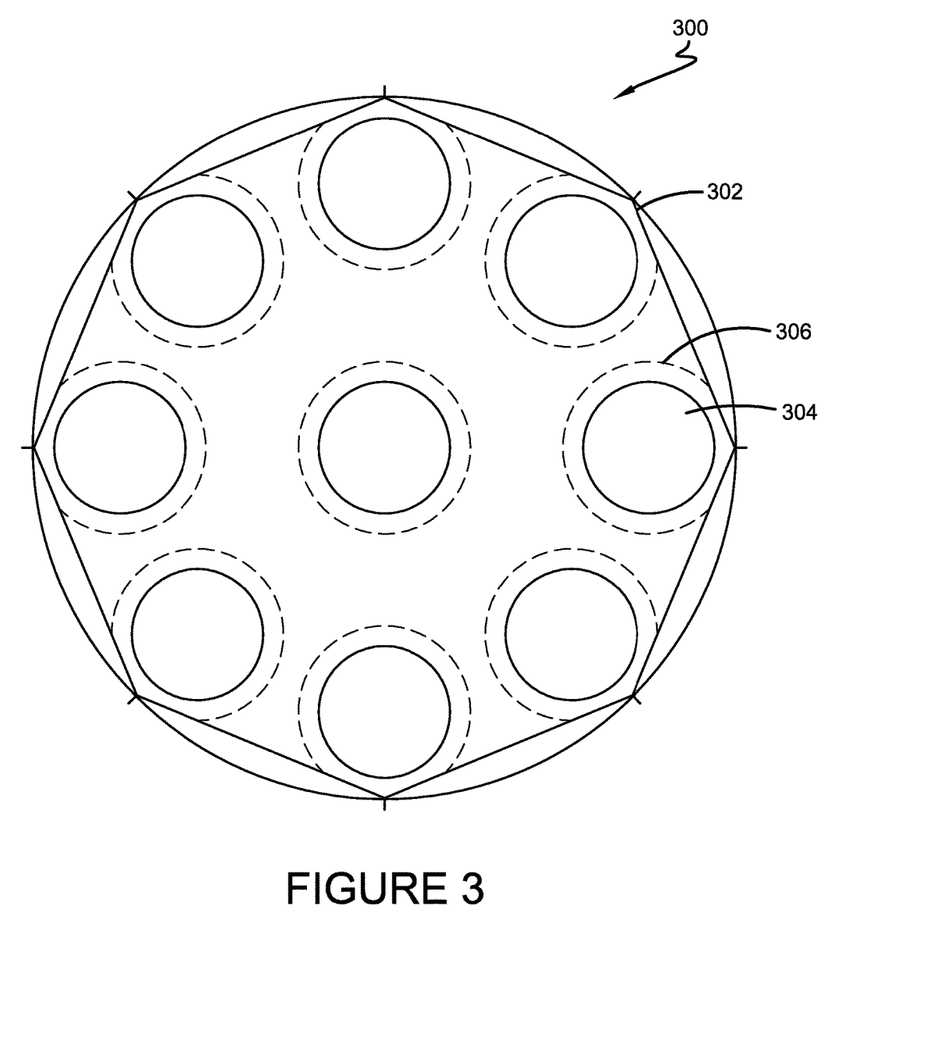
FIGS. 3 and 4 are a component diagrams illustrating example implantation of one or more portions of one or more systems described herein.

In one implementation, the light source component 204 may comprise of a plurality of light source modules 210, including a first illumination module 210a, and a second illumination module 210b, and a third illumination module 210c, etc., which can respectively be configurable to have an assigned identifier (e.g., component address) linked within the system. In one implementation, the second illumination module 210b can be configured to direct light to the first target area 154a and/or a second target area 154b. Further, as illustrated in FIG. 3, respective modules 300 (e.g., 210) can comprise one or more light sources 304 (e.g., lights, such as LEDs, or other light emitting sources), which may be respectively configurable to also have an assigned identifier linked within the system (e.g., component address). As one example, respective light sources 304 may comprise various light source illuminating properties (e.g., lumen output, color output, etc.), and/or directional properties, that can be adjusted by providing a change in a target illumination point for the light source. That is, for example, a point in space to which the light source may be directed can be adjusted in a variety of ways. For example, the rotational axis values or degrees of rotation can be adjusted in reference to a known point in space, such a home point.

In one implementation, the control system component 202 can be configured to manage the plurality of light modules 210a, 210b, 210c, and/or individual light sources 304. In one implementation, the operation of the light modules 210a, 210b, 210c, and/or individual light sources 304 can be pre-configured according to preprogrammed settings input by a user (e.g., designated user 250). As an example, these settings can be updated periodically, and/or dynamically, such as during an operation session utilizing the illumination system 200. Further, the settings can be updated manually and/or automatically, as chosen and programmed by the user.

In one implementation, the management of the lighting system 200 can be undertaken by the designated user 250, such as by issuing control commands to the control system component 202 using gesture recognition component 214. In this implementation, the gesture recognition component 214 can comprise (e.g., or be coupled with) one or more sensors (e.g., 110 of the object detection component 106 of FIG. 1) that are configured to recognize user gestures (e.g., sensor input 152, using hands, arms and other parts of his body or attachments to his body). As an example, the one or more sensors 110 may comprise a type of camera, electromagnetic sensor, light sensor, sound sensor, etc., which may include some type of energy output and reception). In one implementation, a plurality of recognizable gestures can be stored in the gesture recognition component 214, such as in a database linked with the gesture recognition component 214. As an example, a control menu of gestures may be utilized by the designated user 250, which could be customized and updated for different users in each system. In one example, the control menu can comprise a set of pre-programmed motions of the designated user hands, arms or other parts of his body or attachments to his body known as gestures. The gestures could control the start, stop, illuminating target setup and management without the designated user physically touching the device, for example.

In one implementation, during a designated illumination session in a target area (e.g., 156), if pre-programmed by the designated user 250 (e.g., authorized user), the control system component 202 could dynamically update the illuminating and/or directional properties of respective light sources 304, for example, as function of a location and position of the designated user 250 within the target area 156 associated with the system 200. Further, in one implementation, the exemplary system 200 may be used to provide appropriate illumination of the target location 154 (or locations 154a, 154b) by dynamically receiving sensor data regarding the designated user 250, one or more additional designated subjects 252, and/or other objects located in the target area 156. For example, the sensor data (e.g., input 152) may provide information regarding objects' locations relative to the one or more illumination targets or plurality of targets.

For example, sensors (e.g., 110 of the object detection component 106) may be disposed in a motion control and adjustment component 212 (e.g., or some other sensor component) to receive the sensor input 152 from the objects in the target area 156. The sensor input 152 can provide information regarding object location and movement (e.g., of subjects 252, equipment, etc.). In this example, the sensor data may be compared with pre-determined target location(s) 154 data, previous object location data, and illumination properties data for respective modules 210 (e.g., previously stored data, such as in a local or remote database), such as by the motion control and adjustment component 212.

The motion control and adjustment component 212 (e.g., the object detection component 106 of FIG. 1) can be configured to identify potential adjustments that may be made (e.g., if any) to respective modules 210, and/or lighting sources 304. As described above, for example, such lighting adjustments may comprise adjustments to the direction of the light output, amount of light output, and/or color of light output. As one example, the adjustments to the modules 210, and/or lighting sources 304 may be made to provide a continued amount and type of illumination to a target area 154 during an illumination procedure; even when subjects 252, the designated user 250, or other objects in the target area 256 are moving. In this way, for example, shadows, and other undesired lighting situations may be mitigated.

In another implementation, a user (e.g., designated user 250, or other authorized user) could pre-program an initial target location (e.g., 154), or plurality of targets, for desired illumination. In this implementation, the system settings may be set at as static at least until otherwise programmed, or until the illumination session ends. As an example, in the event of a system failure, malfunction, or otherwise unanticipated behavior during an active illuminating session, the example system 200 can defaults to the static mode, thereby providing illumination to the initial or the home location.

In one implementation, the example illuminating system 200 may comprise a user feedback component 206, that can provide feedback to the user. As one example, feedback may be provided by use of predetermined sound patterns (e.g., through a sound emitter), and/or by a visual user interface (e.g., display component) that can provide the designated user 250 with control commands, logs history, and/or acknowledgements, as well as with current system status and upcoming events. As an example, the control system component 202 can comprise an event logger component 216 that may store and/or track data associated with events and usage of the system 200. The event logger component 216 may also store and/or provide status information, and/or future event information.

In one implementation, the example system can comprise other devices or networks 254 communicatively coupled with the control system component 202. As an example, the example, system 200 can be communicatively coupled to remote systems (e.g., servers, devices, central control systems, printers, intranets, Internet, etc.) through a networking system. In this way, for example, the exemplary system may be online, and discoverable and/or controllable or accessible by remote systems. In this implementation, remote users and/or systems may provide control commands to update or adjust the system 200, and/or use data or other operational data can be sent (e.g., or retrieved from) the system 200 to the remote systems.

Figure 4:
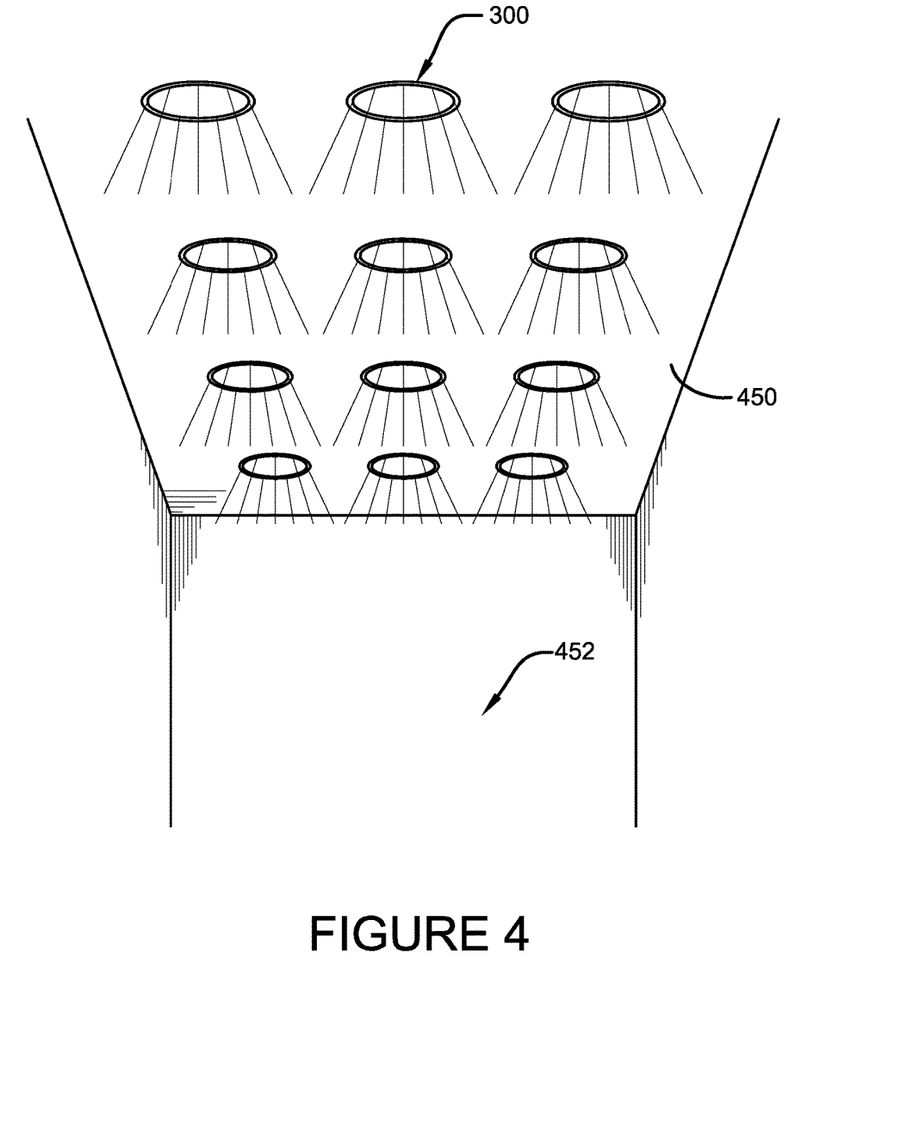

FIGS. 3 and 4 are component diagram illustrating one or more portions of one or more systems described herein. In FIG. 3, an example light module 300 can comprise a housing 302 and one or more light sources 304. In this example, the respective light sources 302 are arranged in the housing 302 in a pattern (e.g., hexagonal) that may provide a desired illumination pattern to a target area (e.g., 452 of FIG. 4). Further, in one implementation, one or more of the light sources 304 may be engaged with a light adjustment component 306. The adjustment component 306 can be configured to adjust one or more of: the amount of light emitted by the light source 304, the color of light emitted by the light source 304, the direction of the light emitted by the light source 304, and/or the type of light (e.g., based on the wavelength) emitted by the light source 304. As an example, respective light sources may comprise one or more different types of light emitting components. For example, different types of light emitting diodes (LEDs) can be included, where respective LEDs emit different wavelengths of light. Further, for example, different light emitting components may be provided to emit light from other (e.g., non-visible, such as infrared, ultra-violet, etc.) wavelengths.

In one implementation, the adjustment component 306 can comprise a device that changes the aim of the light emitted by the light source 304 by physically moving the light source 304, and therefore the direction of aim (e.g., using a motorized device). In another implementation, the adjustment component 306 can comprise a device that changes the aim of the light emitted by the light source 304 by adjusting the direction of the emitted light, such as by using a semisphere, reflectors, or other components that re-direct the light. Further, in one implementation, the adjustment component 306 can be used to turn off and on (e.g., or increase and decrease output of) certain portions of respective light sources 304, such as to re-direct the light direction, to adjust an amount of light emitted, and/or to adjust the color of light emitted. As one example, the light source 304 may comprise a plurality of LEDs that emit light at different wavelengths. In this example, adjusting the output of one or more of the respective LEDs may adjust the color of light emitted by the light source 304.

As an illustrative example, the wavelength of the light emitted by one or more of the light sources 304, and/or modules 300, can be adjusted for different uses. As an example, a light source may comprise a first LED that emits light in the 500-nanometer wavelength, and a second LED that emits light in the 800 nanometer wavelength. In this example, adjusting the amount of light (e.g., by percentage) emitted by the first and second LEDs can differ the output. In one example, a specific wavelength and output may be used to highlight certain tissue for an operation. As another example, another wavelength and output may highlight blood vessels. As additional examples, other wavelengths and output may be provided that facilitates identification of other materials, such as types of metals, polymers, chemicals, and more.

As another illustrative example, during a clinical procedure, a specified amount of lumens (e.g., approximately forty-thousand lumens) of light may be desirable for a target location (e.g., 154), in order to appropriately perform the tasks. In one non-limiting example, respective light sources 304 may provide a five-thousand lumen output. Therefore, as illustrated in FIG. 3, the nine light sources 304 may provide about forty-five thousand lumen as an output for the lighting module 300. In another example, respective light sources (e.g., 304) can provide an amount of lumens of light that equates to a specified amount of lumens of light for the desired task.

As an illustrative example, FIG. 4 illustrates one implementation of the modules 300. In this example, the modules are disposed in a ceiling surface 450, which is located over and above a target area. In this implementation, disposing the respective modules in the ceiling 450 mitigates obstructions in the area, and less clutter. For example, typical target lighting can protrude from the ceiling, or may be located on stands. In this example, these components provide obstacles for the occupants in the area 452, and those working on the operation. Additionally, devices that protrude from the ceiling may obstruct air flow, for example, particularly when the airflow is designed to provide a particular task. As an example, in clinical operating areas, a laminar air flow can be provided to help mitigate transference of infectious material to the patient during a procedure. In this example, by disposing the modules 300 in the ceiling 450, laminar airflow is not obstructed.

In one aspect, the distributed nature and size of the light sources 304 and its arrangement in configurable modules 102 can allow for an installation and setup that is customizable and that mitigates interference with room airflow desired patterns such as, but not limited to laminar airflow. In this aspect, for example, the customizable installation configurations can mitigate illumination interference created by the presence of furniture, equipment and otherwise large and bulky objects in a target area (e.g., 154). Further, in this aspect, the system can mitigate the illumination interference resulting from human traffic and human motion in the target area. Additionally, the system can greatly improve utilization of available light to a designated illumination target location, or target locations, by distributing the light sources, by independently controlling the light sources illuminating properties and direction dynamically as function of the designated user and other subjects' location relative to the illumination target location(s).

With continued reference to FIGS. 1A, 1B, 2 and 3, FIG. 5 is a schematic diagram illustrating an example environment where one or more portions of one or more systems described herein may be implemented. In this example environment 500, a plurality of lighting modules 204 are disposed at or near the ceiling 552 (e.g., may also be disposed at or near walls). In this example, the control system component 202 is also disposed at or near the ceiling; however, the control system component 202 may be located at or near a location in a target area 556, that can provide for desired access for the sensors of the in the object detection component 106, for the sensor input 152. That is, for example, the sensor(s) may be able to receive data from the entire target area 556. Additionally, in this example, the user feedback component 206 can be disposed at a location that is accessible by the designated user 250 (e.g., or other authorized users).

Figure 5:
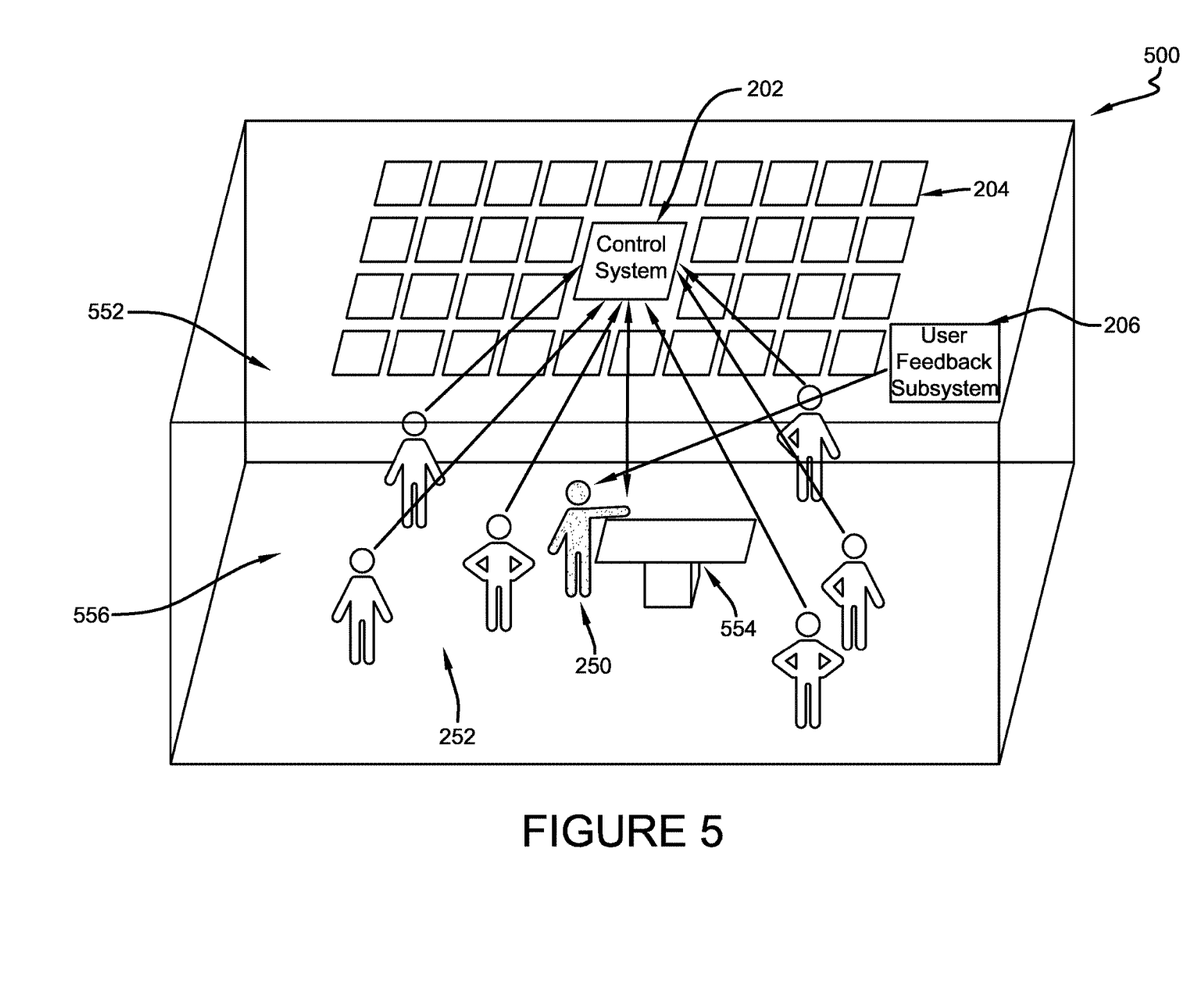
FIG. 5 is a schematic diagram illustrating an example environment where one or more portions of one or more systems described herein may be implemented

In the example environment 500, a target location 554 can comprise the location where an specified operation occurs (e.g., a surgical procedure). In some implementations, the example environment 500 can comprise a plurality of target locations 554, which may be located proximate to each other. As an example, a surgical or other clinical procedure may comprise elements that take place in several locations. In this example, the multiple locations can be sufficiently illuminated, based on pre-determined or programmed user input, and/or dynamic designated user input (e.g., using gestures). Further, in some implementations, additional subjects 252 may be present in a target area 556, for example, additional clinicians, such as nurses, other doctors, etc.

As an illustrative example, in this example environment 500, the designated user 250 may be performing a particular surgical procedure on a patient. The patient can be placed at the target location 554, and the target location can be illuminated in a desired manner, based on pre-programmed input for that particular procedure. Additionally, one or more of the respective lighting modules 204 may be directed to illuminate the target location 554 on the patient. In this example, during the procedure, the designated user 250, and/or one or more of the other subjects 252 may move around the target area 556, and may block, at least partially, some of the light emitted by the modules 204. In this example, the one or more sensors of the object detection component 106 can identify that light has been blocked or will be blocked base on movement (e.g., by extracting coordinates and line of sight for respective modules 204, and/or light sources 304). As described above, the control system component 202 can identify the potential light loss (e.g., shadow creation) and provide adjustment data to affected modules 202, which can accordingly adjust the light output.

In one implementation, in this example, the designated user 250 may identify a need to adjust certain lighting properties (e.g., location, type, color, intensity). The designated user 250 can provide one or more gestures (e.g., using hands, etc.) that are associated with corresponding adjustment commands identified by the control system component 202. In this example, the control system component 202 can then provide the adjustment data corresponding the gesture-based command. Further, the designated user 250, and/or one or more of the other subjects 252, can view (e.g., or listen to) output from the user feedback component 206 (e.g., on a display) to identify the status of the system, and/or any updates, troubleshooting, etc. Additionally, the designated user 250, and/or one or more of the other subjects 252, may provide user input to the user feedback component 206, such as to adjust one or more components of the system.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Reference throughout this specification to "one implementation" or "an implementation" means that a particular feature, structure, or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

What is claimed is:

1. A system for illuminating a target area, comprising:
   an array of illumination modules comprising a first illumination module and a second illumination module, the first and second illumination modules respectively directing light toward a first illumination target in a target area;
   the first illumination module comprising a plurality of light sources and one or more light adjustment components, the respective one or more light adjustment components adjusting a direction of light emitting from one or more light sources in the first illumination module;
   an object detection component that dynamically detects an object in the target area, and detects an amount of illumination interference provided by the detected object between the first illumination module and the first illumination target; and
   an illumination module adjustment component that receives data indicative of the detected object from the object detection component, and transmits data indicative of an illumination adjustment to the second illumination module, the data indicative of an illumination adjustment based at least upon the data indicative of the detected illumination interference.

2. The system of claim 1, wherein the first and second illumination modules respectively direct light toward a second illumination target in the target area upon the illumination module adjustment component receiving data indicative of a user input directing illumination of the second illumination target.

3. The system of claim 1, wherein the respective illumination modules of the array comprise a plurality of light packages, the plurality of light packages respectively comprise a light source and a light adjustment component.

4. The system of claim 3, wherein a first light adjustment component directs light from an associated first light source to the first illumination target, and the first light adjustment component utilizes data indicative of an illumination adjustment to direct the associated first light source to a second illumination target in the target area.

5. The system of claim 1, wherein the respective one or more light adjustment components adjusts a wavelength of light emitted from one or more light sources.

6. The system of claim 1, wherein the object detection component comprises one or more sensors that detect a location and movement of the object in the target area.

7. The system of claim 6, wherein one or more of the one or more sensors automatically detects a location, movement, and/or configuration of a target object proximate the first illumination target, the one or more sensors comprising one or more of:
a camera;
an electromagnetic sensor; and
a wave detecting sensor.

8. The system of claim 1, wherein the illumination module adjustment component comprises a processor that uses the data indicative of the detected object to generate the data indicative of an illumination adjustment, the data indicative of an illumination adjustment results in an adjustment to one or more of the illumination modules in the array to accommodate the illumination interference provided by the object to provide desired illumination to the first illumination target.

9. The system of claim 1, wherein the object detection component comprises one or more sensors that detect a user gesture in the target area and generate data indicative of the user gesture, the data indicative of the user gesture is used to set the first and second illumination modules to illuminate the first illumination target.

10. The system of claim 9, wherein the illumination module adjustment component comprises a processor that uses the data indicative of the user gesture to generate data indicative of an illumination adjustment to set the first and second illumination modules to illuminate a second illumination target.

11. The system of claim 9, wherein the user gesture comprises a pre-determined gesture corresponding to a pre-determined resulting action performed by one or more illumination modules in the array.

12. A method for providing illumination to a target illumination area, comprising:
installing an array of illumination modules, comprising a first illumination module and a second illumination module, proximate to a first illumination target in a target illumination area, the first and second illumination modules respectively directing light toward at least a first illumination target in the target illumination area; and
wherein the first illumination module comprises a plurality of light sources and one or more light adjustment components that can adjust a direction of light emitted from one or more of the plurality of light sources; and
installing an object detection component proximate to the target illumination area, the object detection component dynamically detecting an object in the target illumination area during an illumination event, and detecting an amount of illumination interference provided by the detected object between the first illumination module and the first illumination target; and
installing an illumination module adjustment component proximate to the target illumination area, the illumination module adjustment component receiving data indicative of the detected object from the object detection component, and transmitting data indicative of an illumination adjustment to the second illumination module, the data indicative of an illumination adjustment based at least upon the data indicative of the illumination interference.

13. The method of claim 12, comprising one or more of the illumination modules in the installed array illuminating a second illumination target in the target illumination area during the illumination event.

14. The method of claim 12, comprising installing a user feedback component that provides system feedback to a designated user, and allows the designated user to provide system input.

15. The method of claim 12, comprising installing the object detection component comprising installing one or more sensors that detect a location and movement of the detected object in the target illumination area.

16. The method of claim 12, comprising installing the illumination module adjustment component comprising installing one or more processors that use the data indicative of the detected object's location and movement to generate the data indicative of an illumination adjustment, the data indicative of an illumination adjustment resulting in an adjustment to one or more of the illumination modules in the array to accommodate the illumination interference provided by the object to provide desired illumination to at least the first illumination target.

17. The method of claim 12, comprising installing the illumination module adjustment component comprising installing a user gesture identification component that identifies a pre-determined gesture corresponding to a pre-determined resulting action performed by one or more illumination modules in the array, to adjust light directed to one or more illumination target in the target illumination area.

18. A system for illuminating a target area, comprising:
an illumination array comprising a plurality of illumination modules at least two of which direct light at least toward a first illumination target in a target illumination area, respective illumination modules comprising a light source and a light adjustment component, the respective light adjustment components adjusting a direction of light emitting from an associated light source;
an object detection component comprising one or more sensors that automatically detect a location and movement of an object in the target area, and automatically detect an amount of illumination interference provided by the detected object between the one or more of the illumination modules and the first illumination target; and
an illumination module adjustment component comprising one or more processors, the illumination module adjustment component receives data indicative of the detected object from the object detection component, and transmits data indicative of an illumination adjustment to at least one adjustment component in the one or more illumination modules, the data indicative of an illumination adjustment resulting from the data indicative of the detected object and one of:
a pre-determined gesture of a designated user; and
an object movement that results in the illumination interference of a desired amount of illumination of the first illumination target.

* * * * *